Figure 1:
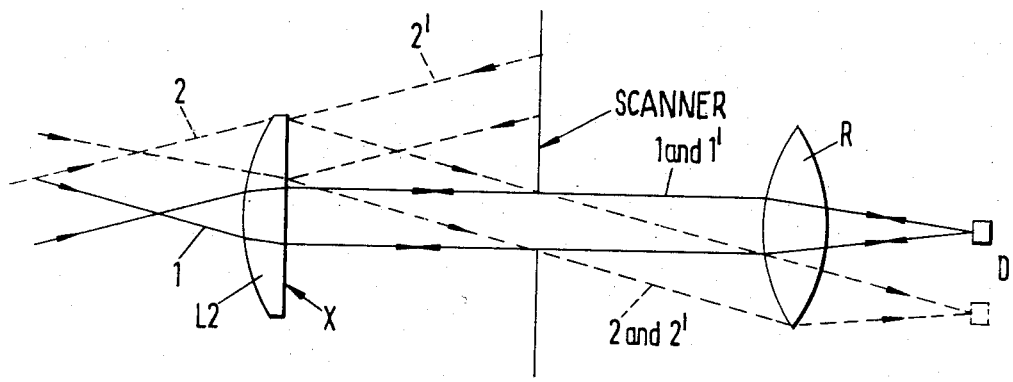

United States Patent [19]

Moore et al.

[11] 4,234,240

[45] Nov. 18, 1980

[54] OPTICAL SCANNING SYSTEM WITH UNWANTED REFLECTIONS CONTROLLED

[75] Inventors: William T. Moore; Michael T. Sweeney, both of London, England

[73] Assignee: The Rank Organization Limited, London, England

[21] Appl. No.: 764,987

[22] Filed: Feb. 2, 1977

[30] Foreign Application Priority Data

Feb. 2, 1976 [GB] United Kingdom ............... 4075/76

[51] Int. Cl.³ ............................................. G02B 27/19
[52] U.S. Cl. ...................... 350/6.1; 350/199; 350/212; 350/205
[58] Field of Search .......... 350/7, 6, 17, 205, 276 SL, 350/206–208, 199, 175 TS; 250/235, 236; 358/205–208

[56] References Cited

U.S. PATENT DOCUMENTS

| | | | |
|---|---|---|---|
| 2,492,461 | 12/1949 | Bouwers | 350/199 |
| 2,738,700 | 3/1956 | Taylor | 350/206 |
| 3,706,484 | 12/1972 | Doi et al. | 350/6.8 |
| 3,825,315 | 7/1974 | Altman et al. | 350/7 |
| 3,829,192 | 8/1974 | Wheeler | 350/7 |
| 3,909,104 | 9/1975 | Menke | 350/6 |
| 4,029,389 | 6/1977 | Runciman | 350/6.3 |

OTHER PUBLICATIONS

Jenkins & White, *Fundamentals of Optics,* 3rd ed., 1957, pp. 98–101.

*Primary Examiner*—Jon W. Henry
*Attorney, Agent, or Firm*—Brisebois & Kruger

[57] ABSTRACT

This relates generally to optical systems, and one application of the invention is for reducing deleterious effects produced by surface reflections on lenses in thermal imaging systems.

11 Claims, 6 Drawing Figures

OPTICAL SCANNING SYSTEM WITH UNWANTED REFLECTIONS CONTROLLED

This invention relates generally to optical systems, and one application of the invention is for reducing deleterious effects produced by surface relections on lenses in thermal imaging systems.

An example of a type of optical system in which internal surface reflections may cause problems is that described in out copending application Ser. No. 714,492, filed Aug. 16, 1976, now U.S. Pat. No. 4,106,845. In the infra-red scanning systems disclosed therein a scene is scanned by means of a rotating polygon and a reciprocating mirror. Now if the energy reflected from the surface of, in particular, the plane surface of lens L2 is considered—this reflection being due to the practical impossibility of avoiding unwanted reflections altogether—it is seen that at the midpoint of the scan, when the rays are normal to the lens surfaces, the reflected energy derives, via the scanning system, from the detector itself. However, at other points in the scan the reflected energy derives from the body of the apparatus.

In many optical systems these reflected energies will be substantially equal. However, in some systems, notably thermal (infra-red) imaging systems operating with cooled detectors, the energies may differ from each other, with the result that a light or more often, a dark patch will appear superimposed on the centre of the viewed picture.

Such effects can be minimised to a degree, but not completely, by using high quality anti-reflection coatings on the offending lenses, if necessary also employing bandpass or longpass filters to restrict the energy to the performance band of the coatings. It is also possible, though usually not desirable, to correct for the reflection electronically.

Furthermore, since the strength of the effects is dependent upon the degree to which focus is maintained in the reflection, it may happen that the shape of a lens is such that the reflection is defocussed thereby resulting in "dilution" of the reflected energy to an acceptable level.

However, these approaches to solving the problem are not entirely satisfactory.

According to the present invention there is provided an optical system comprising at least one optical surface giving rise to unwanted reflections within the system, wherein the centre of curvature of the optical surface, or the image of the centre of curvature through other optical surfaces of the system, is located at or near the energy defining aperture of the system, or at or near an image of the energy defining aperture.

Although it may not always be possible to apply this technique to all the offending lens surfaces in an optical system, if it is applied to those lens surfaces which would otherwise contribute most to the unwanted reflection problem a considerable improvement in image quality will be obtained. This improvement results from the fact that the strength of reflection, from the surface or surfaces to which the invention is applied, remains substantially constant over a substantial part of the field of view.

Figure 2:
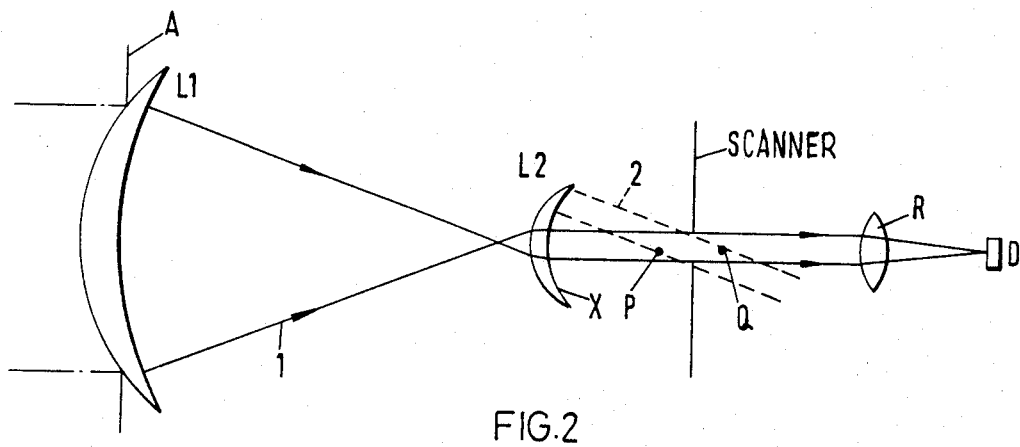
Figure 2A:
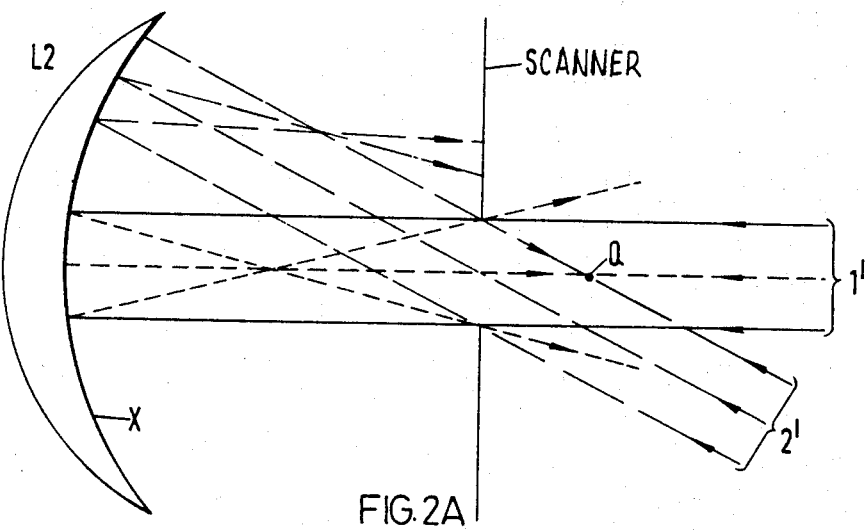
Figure 3:
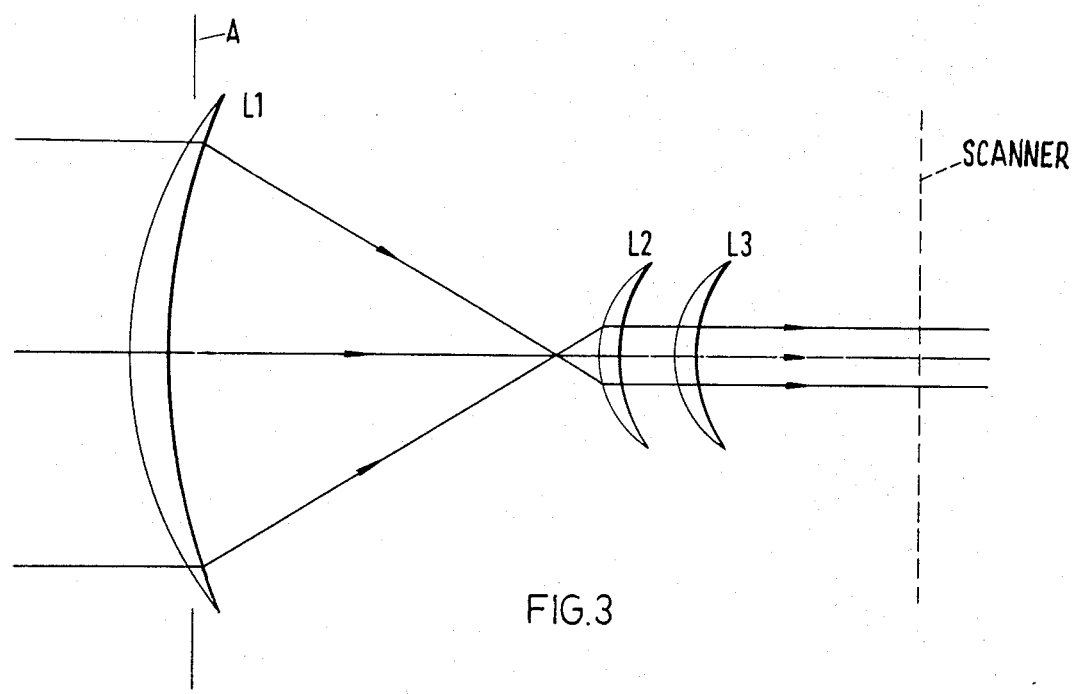
Figure 4:
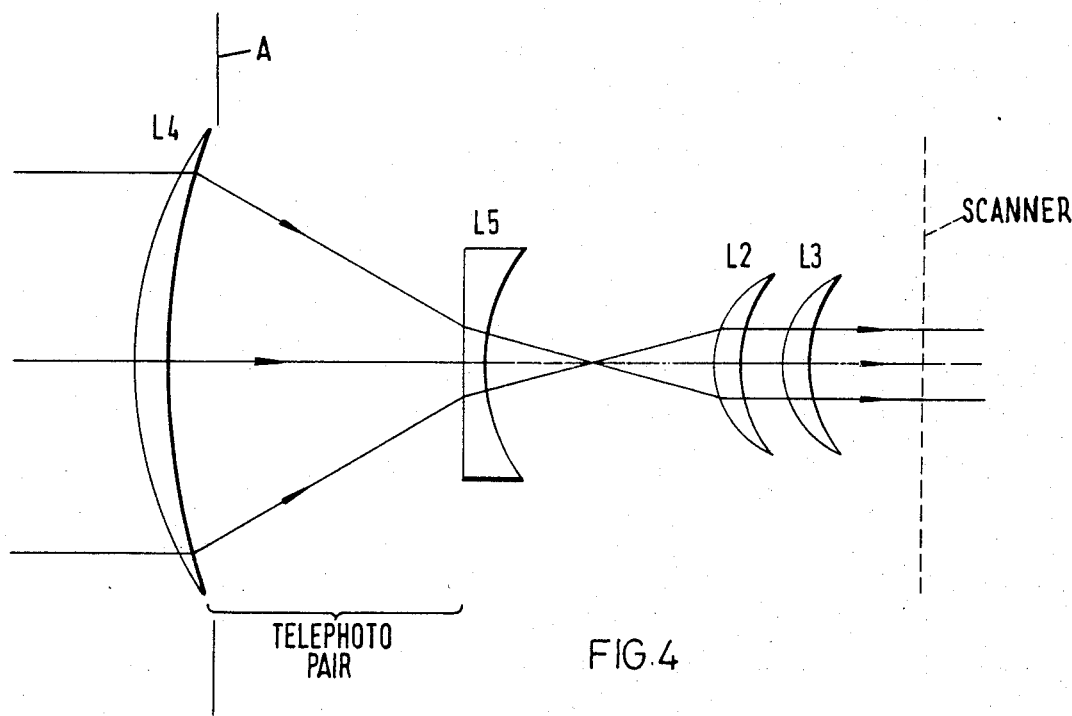
Figure 5:
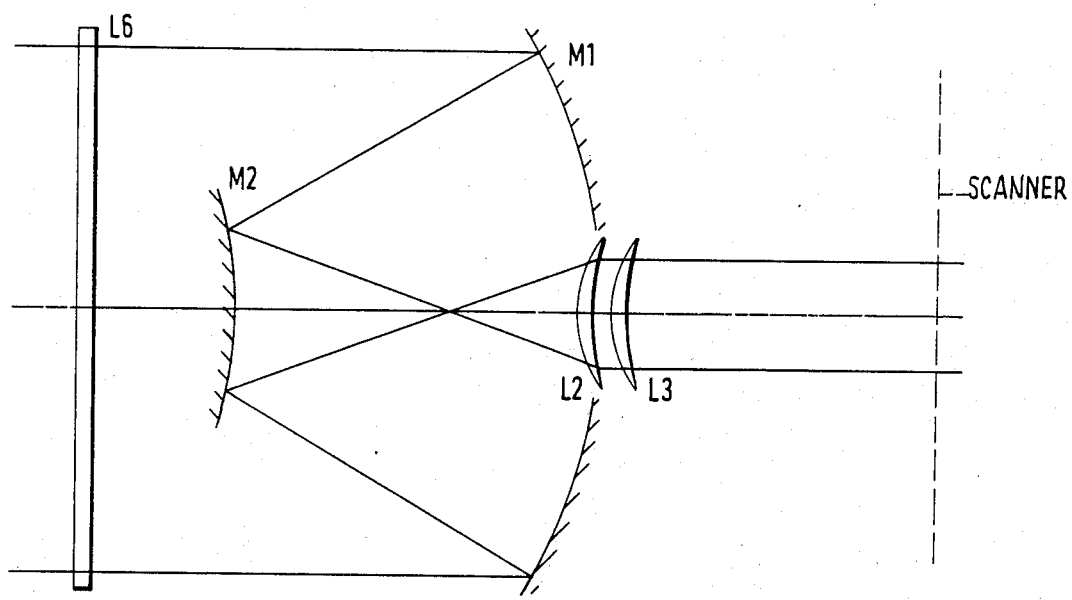

Embodiments of the invention will now be described, by way of example, with reference to the accompanying drawings in which:

FIG. 1 is a schematic diagram of part of the apparatus shown in FIGS. 1, 3 and 4 of our copending application Ser. No. 714,492, filed Aug. 16, 1976, now U.S. Pat. No. 4,106,845 and is included to illustrate the nature of the problem which the present invention seeks to mitigate, FIG. 2 is a schematic diagram of a first embodiment of the invention, FIG. 2A is a diagram of part of FIG. 2 showing how FIG. 2 operates to reduce the effect of unwanted reflections, and FIGS. 3, 4 and 5 are further embodiments of the invention.

In FIG. 1, which represents a part of the apparatus shown in FIGS. 1, 3 and 4 of our copending application Ser. No. 714,492, filed Aug. 16, 1976 now U.S. Pat. No. 4,106,845, the vertical line S represents the scanning system upon the rotating polygon of which an image of the system aperture is focussed by the lens L2. The system aperture is the aperture of the objective lens (not shown). The lens R represents the optical elements which focus the scanned radiation onto the detector D. The solid lines 1 represent radiation from the centre of the field of view being scanned (on-axis points) and the broken lines 2 represent radiation from off-axis points of the field of view. Although the detector D is shown in two positions receiving the on-axis and off-axis radiation respectively, it is to be understood that the detector actually is stationary. The change in position shown in the figure is symbolic of the scanning action performed by the scanning arrangement, and may be regarded as the apparent movement of the detector relative to the fixed optical components prior to the scanning arrangement.

It will now be seen how the reflected radiation varies with the point in the field of view being scanned. Clearly, for substantially on-axis points the radiation 1' reflected from the plane surface X of the lens L2 is derived mainly from the detector D. For off-axis points, however, the reflected radiation 2' is derived from the body of the apparatus.

FIG. 2 illustrates an embodiment of the invention similar to that of FIG. 1 in which the effects of the unwanted reflection from the surface X of the lens L2 is reduced. In FIG. 2, S again represents the scanning system consisting of a rotating polygon and reciprocating mirror, R represents the optics which focusses the scanned radiation onto the detector D, L1 is the objective lens of the system, and L2 images the aperture A of the objective lens L1 onto the polygon sides. All these components serve the same function as they do in FIGS. 1, 3 and 4 of copending application Ser. No. 714,492, filed Aug. 16, 1976 now U.S. Pat. No. 4,106,845 and that application may be referred to for fuller details.

The difference in the system of the present FIG. 2, however, is that the shape of lens L2 is such that the reflected radiation contains the detector over a large angle of scan, rather than only for approximately on-axis angles of scan. This is achieved by so choosing the radius of curvature of the Surface X of lens L2 that its centre of curvature lies at or near the image at the scanning system of the objective aperture, between the points P and Q for example. In this embodiment, and the embodiments to follow, the objective aperture A is assumed to be the energy defining aperture of the system.

With this arrangement, for any field angle from the on-axis pencil of rays 1 out to the field angle corresponding to the off-axis pencil of rays 2, which pencil of rays 2 just includes within itself the centre of curvature of the surface X which is assumed to be at one of the extreme positions P or Q, there is always one ray of radiation emanating from the detector which will return to the detector after reflection at surface X of L2.

This is shown in FIG. 2A for the centre of curvature at the point Q. Pencil or rays 1' represents radiation emanating on-axis from the detector when the field angle is zero, and pencil of rays 2' represents radiation emanating off-axis from the detector when the field angle is such that the point Q lies just inside the cross-section of the pencil 2'. It will be seen that in each case one ray returns to Q and thus back to the detector. The same applies to all field angles between these two; one ray will always return to the detector. Thus, at least over the portion of the viewed picture within the limits defined by a field angle corresponding to the pencil of rays 2' the strength of the reflection will remain constant. Clearly, by an examination of FIG. 2A, the closer the point Q is to the image plane of the objective aperture the greater will be the field angle for which a ray is always reflected to the detector, and therefore the greater the area of viewed picture for which the effects of reflection from the surface X will be constant.

The same principle can be applied to the concave surface of lens L1, although here it is the image of the centre of curvature of the lens L1 through the lens L2 which should be between the points P and Q. This will render substantially constant the reflection from lens L1 over a large area of the viewed picture.

FIG. 3 shows a further embodiment of the invention which is a modification of FIG. 2. Here, the single meniscus lens L2 has been replaced with a pair of lenses L2 and L3. This may be necessary to obtain sufficiently large field angles in a practical instrument. In this case the concave surfaces of L2 and L3 are curves so that the centre of curvature of the latter, and the image of the centre of curvature of the former through L3, lies at or near the image (assumed to be at S) of the objective aperture A. Furthermore, the image of the centre of curvature of the concave surface of L1 through L2 and L3 may lie at or near the image of the objective aperture. In this way the effect of reflections at all three concave surfaces is substantially reduced.

It is possible to apply the same principle to the convex surfaces of the lenses in the system, such as the convex surfaces of the lenses L1, L2 and L3. In this case the images of the centres of curvature of the convex surfaces of L1, L2 and L3, through the various intervening lens surfaces, will be at or near S. However, clearly it will rarely be possible to apply the principle to all the offending lens surfaces in a system since this will usually conflict with the design requirements for the normal function of the system. However, the principle should be applied as extensively as possible consistent with these design requirements and certainly on those lens surfaces most prone to unwanted reflections.

In the case of FIG. 3, for example, it would not be practically possible to have all six surfaces of L1, L2 and L3. curved for constant reflection in the manner described. Thus, in this case, the concave surfaces of L1, L2 and L3 would be chosen as has been already described. However, since in a practical instrument L1 and L2 or L1 and L3 are aspheric lenses (to correct for abberation) it should be possible for the convex surfaces of these lenses to be curved for constant reflection at least over part of the field.

FIG. 4 illustrates a further embodiment of this invention which is similar to FIG. 3 except that the aspheric lens L1 has been replaced by a "telephoto pair" L4 and L5. Similar considerations apply concerning the curvature of the various lens surfaces as has already been discussed in relation to FIG. 3.

FIG. 5 illustrates our embodiment of the invention in which the objective lens systems of the arrangements described above have been replaced by a concave mirror M1 the centre of which is apertured and contains the lenses L2 and L3, and a convex mirror M2. A weak lens or corrector plate L6 may be included. Mirrors M1 and M2 may be aspheric, and M2 may be a "Margin" mirror.

In the embodiments described above, in all cases the centres of curvature (or their images) of the various lens surfaces from which substantially constant reflection was required lay at or near the image of the energy defining aperture of the system. Clearly, this is because the energy defining aperture, being the aperture of the objective, lay at the entrance to the system. However, where the energy defining aperture lies within the system, those lenses having surfaces curved for constant reflection and lying in front of the energy defining aperture may have the corresponding centres of curvature (or their images) at or near the actual aperture rather than its image.

Furthermore, although the foregoing description has been entirely in terms of lens surfaces curved for constant reflection, it is clear that the principles discussed are applicable to curved mirror surfaces within an optical system.

We claim:

1. In a thermal imaging system comprising scanning means for effecting scanning of a distant scene, a first optical sub-system for collimating radiation from the distant scene and directing the resultant collimated beam on to the scanning means, a detector having a detecting surface, a second optical sub-system for directing radiation from the scanning means to be incident on the detecting surface of the detector effectively normal to said surface, and means defining an aperture stop for passing all the rays from the distant scene to be scanned within a defined field of view, the optical sub-systems comprising optical elements bearing at least one optical surface which gives rise to unwanted reflections of radiation within the system; the improvement wherein said at least one optical surface has its center of curvature or an image thereof in a fixed location at least approximately at the aperture stop means or an image thereof, thereby to cause the unwanted reflections incident on the detecting surface to be of substantially uniform magnitude throughout scanning within the defined field of view.

2. An optical system as claimed in claim 1 wherein the first optical sub-system focusses an image of the aperture stop means onto the scanning means, and at least one optical surface of the first optical sub-system has its centre of curvature, or an image of its centre of curvature, approximately at the image at the scanning means of the aperture stop means.

3. An optical system as claimed in claim 2, wherein the at least one optical surface of the first optical sub-system is the concave surface of a meniscus lens.

4. An optical system as claimed in claim 3, wherein the concave surface is the nearest curved optical surface, along the optical path of the first optical sub-system, to the scanning means.

5. An optical system as claimed in claim 4, wherein the first optical sub-system comprises a further meniscus lens adjacent the first meniscus lens, the concave surface of the further lens having the image of its centre of curvature through the first lens located approximately at the image at the scanning means of the aperture stop means.

6. An optical system as claimed in claim 4, wherein the first optical sub-system further comprises an objective means incorporating the aperture stop means and for receiving radiation from the scene being scanned and directing the radiation to the meniscus lens.

7. An optical system as claimed in claim 6, wherein the aperture stop means is constituted by the first optical component of the objective means.

8. An optical system as claimed in claim 6, wherein the objective means comprises a single meniscus lens.

9. An optical system as claimed in claim 6, wherein the objective means comprises a pair of lenses arranged as a telephoto pair.

10. An optical system as claimed in claim 6, wherein the objective means comprises a concave mirror for receiving radiation from the scene being scanned and a convex mirror for reflecting the received radiation to the meniscus lens or lenses.

11. An optical system as claimed in claim 3, wherein at least a part of a convex surface of a meniscus lens has an image of its centre of curvature approximately at the image at the scanning means of the aperture stop means.

* * * * *